Dec. 5, 1950 N. H. TAYLOR ET AL 2,532,964
AUTOMATIC ELECTRONIC TOLERANCE MONITOR
Filed Aug. 8, 1947 2 Sheets-Sheet 1
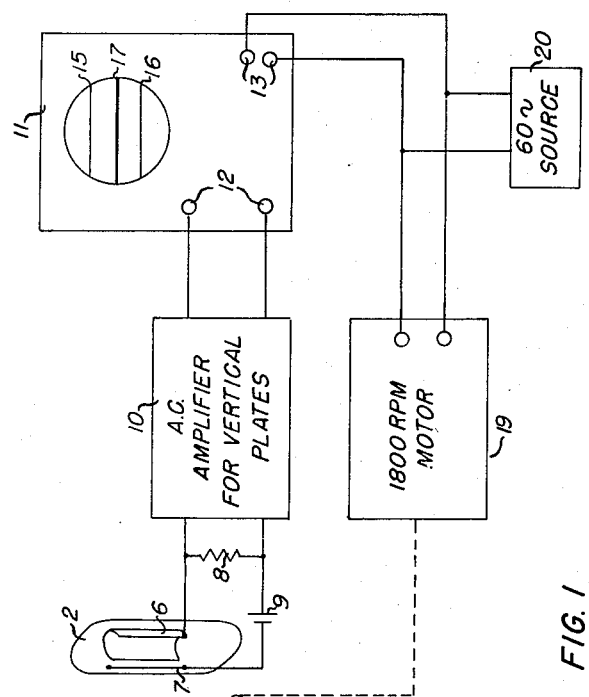
FIG. 1
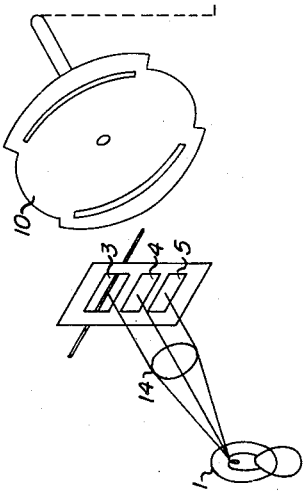
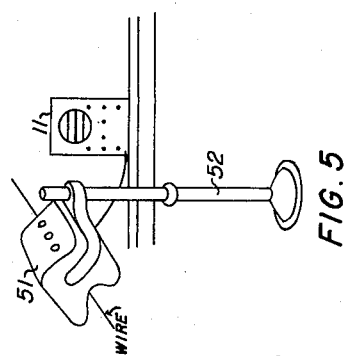
FIG. 5
Inventor
NORMAN H. TAYLOR
RAYMOND M. WILMOTTE
By
Samuel J Snyder

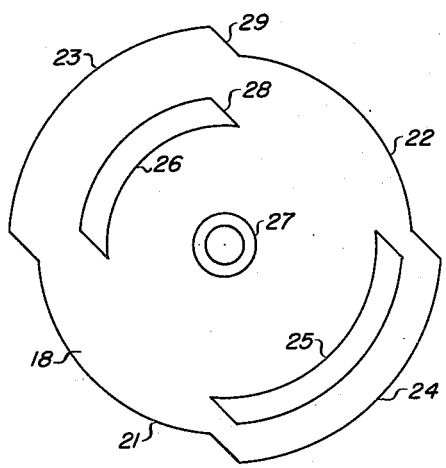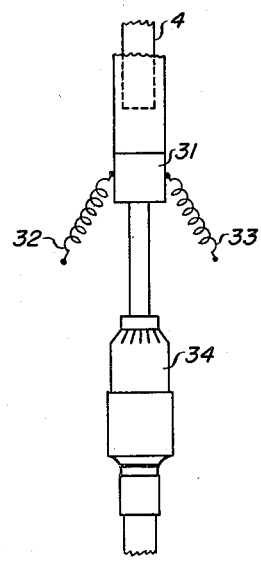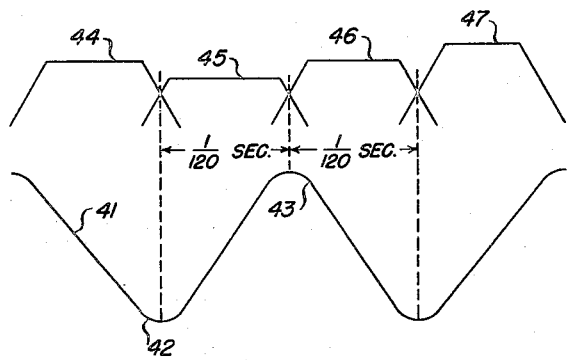

Patented Dec. 5, 1950

2,532,964

UNITED STATES PATENT OFFICE 2,532,964

AUTOMATIC ELECTRONIC TOLERANCE MONITOR

Norman H. Taylor, Manchester, Mass., and Raymond M. Wilmotte, Washington, D. C.; said Taylor assignor to Raymond M. Wilmotte, Washington, D. C.

Application August 8, 1947, Serial No. 767,428

9 Claims. (Cl. 88—14)

This application is related in subject matter to U. S. Patent #2,505,316, issued April 25, 1950, to Wilmotte et al., and to an application for Letters Patent Serial No. 157,996, filed April 25, 1950, in the name of Raymond M. Wilmotte, and entitled "Visi-Limit Micrometer."

This invention relates to an electronic micrometer gauge for giving a substantially continuous and instantaneous measurement of a dimension of a production line product and indicating whether the dimension lies within desired tolerances.

In the manufacture of precision parts on a mass production basis, it is essential to closely monitor the products to determine whether the dimensions are being held within specified tolerances. The use of a micrometer or dial indicator for making such measurements has serious limitations. First of all, the time required for making a measurement with these instruments makes it altogether impractical to measure each product and makes necessary the compromise of sampling. Sampling by making spot checks often is inadequate and in any event, frequently results in high losses. Other very great disadvantages of micrometer and similar measuring devices are that the product can be measured only after it leaves the production line, or else requires interruption of the production line. Still another very serious disadvantage of micrometer and dial indicators is that they require sensible contact with the object to be measured and therefore give rise to important errors when measuring soft materials subject to deformation or damage.

In the manufacture of wire, for example, it is required to gauge the diameter of a wire which travels past the measuring instrument at the rate of hundreds of feet per minute and to determine that the diameter is being held within the desired tolerances. It is essential to make these measurements without stopping the production line. The accuracy of measurement required is about .001". It is obvious that these requirements cannot be fulfilled by a mechanical micrometer, although a good mechanical micrometer does have the desired accuracy. The mechanical micrometer would require stopping the wire and the measurement would take too long and be too tedious. With a mechanical micrometer, it would be feasible only to make widely scattered spot checks. With the electronic gauge of my invention, all these requirements are completely fulfilled.

Our electronic micrometer utilizes a photo-cell and a light which illuminates the photocell through three slots. One of the slots is partially obscured by the object to be gauged. The unobscured portion of the slot is a measure of the size of the object. The two remaining slots are adjusted to allow given areas of light to fall on the photocell. These slot areas represent upper and lower limits respectively of the size of the object. A rotating disc permits the light to strike the photocell through only one slot at a time and thereby creates a sequence of signals from the photocell. These signals are amplified and presented on an oscilloscope screen. The rate of rotation of the disc is high enough so that the oscilloscope screen persistence causes all three traces to appear at the same time and thereby admit of comparison.

It is one object of our invention to provide an apparatus for indicating during the manufacturing process, whether the dimension of an object lies within the specified tolerances.

It is another object of our invention to continuously indicate whether the output of a production line is being held within specified tolerances without interrupting the production line.

It is a further object of our invention to provide a means for indicating whether the dimension of a production line product lies within specified tolerances without touching the product or stopping its movement along the production line.

It is an object of our invention to provide an electronic gauge capable of continuously indicating whether the dimension of an object, such as a rapidly moving wire, lies within required upper and lower limits.

It is another object of our invention to provide apparatus capable of gauging the dimension of an object, such as a rapidly moving wire, practically instantaneously and with the accuracy of a precision mechanical micrometer.

Another object of our invention is to produce a micrometer which will be substantially uninfluenced by voltage variations, movement or vibration of the object being measured, or variations of circuit constants.

It is still another object of our invention to provide a highly accurate, easily legible, rapid micrometer which is simple in operation and requires no adjustments in operation, once the desired tolerances are set up.

The method and apparatus by which we obtain the above stated objectives and advantages, will be fully understood from the following description and drawings in which:

Fig. 1 is a schematic representation of the apparatus of our invention.

Fig. 2 is a plan view of the scanning disc.

Fig. 3 is a detailed view of one of the slots, showing the micrometer adjustment therefor.

Fig. 4 shows curves helpful in explaining the operation of our invention.

Fig. 5 shows one arrangement of our apparatus.

Referring particularly to Fig. 1 of the drawing, there is shown a lamp 1, adapted to illuminate a photocell 2, through the slots 3, 4 and 5. The photocell 2 has an anode 6, and a cathode 7, connected in series with a resistor 8 and a source of voltage 9. The output of the photocell is developed across the resistor 8, and is applied to the input of an A. C. amplifier 10. The A. C. amplifier is one having condenser and resistor interstage or output coupling and therefore capable of amplifying only voltage changes, but not capable of amplifying steady D. C. voltages. The output of amplifier 10 is connected to the vertical plates of an oscilloscope 11, which may contain the usual variable gain vertical and horizontal deflection amplifiers. A rotating disc is apertured in a manner to be described hereafter, so as to permit the lamp 1, to illuminate the photocell 2, through the slots 3, 4 and 5 sequentially. A lens 14, is provided to collimate the light from lamp 1. When the light is so collimated, the error due to movement of the object toward slot 3 is minimized. The source 20 energizes the synchronous motor 19 and is also connected to the horizontal plates of the oscilloscope. Consequently the rotation of the motor 19 is synchronous with the sweep of the oscilloscope. The source 20 may be the ordinary 60 cycle, A. C. supply.

It will be evident from the description so far given, that the same lamp, photocell, amplifier and oscilloscope are used for indicating the signals from each of the slots 3, 4, and 5. By virtue of this fact, no first order inaccuracies are introduced by variations in any of these components. In this manner, we have overcome the instabilities of photocell and light circuits arising from variations in supply voltages and circuit components.

The rotating scanning disc 18 is shown in more detail in Fig. 2. The disc 18 is provided with two sections, 21 and 22 of such radius that they uncover the test slot 3. Another section of the disc 18 has an aperture 25 positioned so as to uncover the slot 4 representing the higher limit. Another aperture 26 uncovers the slot 5 representing the lower limit. The angles subtended by the sections 21 and 22 and apertures 25 and 26, are not at all critical. The boundaries of the apertures and the sections 21 and 22 are inclined to the radii as indicated at 28 and 29. This is a very important feature. It has been found that if the light is allowed to pass through two apertures at once, or if the light is blocked off from one aperture slightly before being permitted to pass through the next, the sensitivity of the amplifier is greatly reduced by very high transients. In order to avoid such abrupt variations in the amount of light reaching the photocell, we make the boundaries of the apertures and the sections 21 and 22 at an angle to the radii. By so doing, we are enabled to cut off the light through each aperture gradually and to sweep the light on to the next aperture gradually. If the boundaries of the apertures in the sections 21 and 22 were radial, the disc 18 would have to be cut with a practically unobtainable accuracy to avoid the above mentioned transients and the consequent insensitivity of the system.

The slots 3, 4 and 5 may be the same size and slots 4 and 5 provided with a micrometer-actuated shutter. Referring to Fig. 3, the slot 4, for example, is shown having a shutter 31 held against the jaw of a screw micrometer 34 by means of springs 32 and 33. Adjustment of the micrometer 34 moves the shutter 31 against the springs 32 and 33 to cover more of the slot 4.

The signals corresponding to the upper and lower limits and the measured dimension will be represented by the traces 15, 16 and 17, respectively. In order to avoid residual transients arising at the change-over from one slot to another from appearing on the oscilloscope screen, the scanning disc is positioned so that the change-over from one slot to another occurs at the ends of the oscilloscope sweep. This will be clear by the reference to Fig. 4, wherein the curve 41 represents the A. C. voltage impressed on the horizontal plates of the oscilloscope. The peaks 42 and 43 of this curve therefore correspond to the ends of the sweeps. The distance between adjacent peaks 42 and 43 is approximately 1/120 of a second for 60 cycle A. C. The apertures 25 and 26 of the scanning disc and the sections 21 and 22 are made substantially 90°. The disc is then positioned on the motor shaft so that the test signals 44, 45, 46 and 47 are synchronized and phased with the A. C. voltage 41 as indicated in Fig. 4, that is, the change over from one slot to another occurs at the peaks of the A. C. curve 41. The perturbations which occur at the change over from one slot to the next therefore occur at the end of the sweeps and the length of the sweep can be adjusted so that their ends do not appear on the oscilloscope screen. In this manner we obtain clear, uncomplicated indications of the diameter of the wire, with respect to the upper and lower limits.

Since the test slot is scanned twice as often as the limit slots, the test trace 17 will appear brighter than the traces 15 and 16, and thus admit of easy identification. We have also found it desirable in some cases, to make the test traces to appear as a double line. This renders the test trace easily distinguishable.

The objects moving along the production line pass over the test slot 4. These objects may be safety razor blades or other small objects. The objects are positioned so as to project the dimension thereof to be measured in the path of the light. The object measured may also be a continuous product such as extruded plastic, bare wire, plastic coated wire, rods, or bars.

The equipment described above will not suffer from the instabilities common to other equipment of this type. Voltage variations which would normally create fluctuations of the oscilloscope pattern, cause no error since all three traces move together when any voltage fluctuations occur. Also, variations in the oscilloscope or amplifier circuits are applied to all three signals. The use of a single photocell for all three signals eliminates errors due to fatigue, temperature changes or other variations which are commonly limiting factors to the accuracy obtained with photocell measuring devices. Errors due to vibrations or movements of the product being measured are minimized, because vibration in the horizontal plane, that is, across the test slot, merely changes the position of the shadow on the photocell and does not change its magnitude, while vibration or movement in the vertical plane is minimized by the use of collimated light.

Fig. 5 shows an arrangement of the apparatus used for measuring wire as it leaves an extrusion head (not shown). A measuring head 51 containing all the apparatus except the oscilloscope 11 is mounted on a stand 52. The oscilloscope 11 is located remotely from the measuring head 51 at a convenient point.

It will be obvious that our invention may be applied to many types of products either without modifications or with simple modifications which would be apparent to those skilled in this art. It will also be apparent that indicators other than an oscilloscope may be used, and even an A. C. meter would be capable of giving an indication, but we prefer to use an oscilloscope. Also the apparatus may indicate only the upper or lower tolerance instead of both tolerances. Many such variations of our invention will be apparent to those skilled in this art.

We claim:

1. In a system for monitoring the tolerance of a dimension of the product of a high speed production line, a member having a test slot partially obstructed in width by said dimension of said product and a comparison slot, said test slot having a larger width than the said dimension, a photo-cell having an output circuit, means for illuminating said photo-cell alternately through said test slot and through said comparison slot to generate unidirectional voltage pulses in said output circuit, a cathode ray tube indicator tube comprising means for generating a cathode ray beam, first means for deflecting said cathode ray beam in a first coordinate direction, second means for deflecting said cathode ray beam in a second coordinate direction, means comprising an amplifier for amplifying alternating current signals only, means connecting said amplifier to said output circuit for amplifying only the difference between the peaks of said signals and the mean of said peaks as an alternating current signal, means for impressing said alternating current signal on said first means for deflecting said cathode ray beam, means for generating sweep voltages, means for applying said sweep voltages to said second means for deflecting said cathode ray beam, and means for synchronizing said sweep voltages with illumination of said photo-cell through each of said slots in such manner that light is transferred from one of said slots to another of said slots substantially at the ends of said sweep voltages.

2. A system in accordance with claim 1 wherein is further provided means for gradually increasing illumination through one of said slots while gradually decreasing illumination through the other of said slots during transition of illumination from one of said slots to the other, to minimize variations of illumination through said slots while said illumination is being transferred from one to the other of said slots.

3. In a system for measuring a dimension of an object, a member having a test slot and two comparison slots, said test slot having a larger area than said object and being partially obstructed by said object, the sizes of said comparison slots corresponding respectively to upper and lower limits of said dimension, a source of light, a photo-cell for providing output unidirectional voltage in response to light impinging thereon, a motor, a scanning disc coupled to and driven by said motor, said scanning disc having scanning apertures for illuminating said photo-cell through said slots in sequence, whereby said voltage comprises unidirectional voltage pulses, a cathode ray tube indicator having a cathode ray beam, deflectable in two coordinate directions, an alternating current amplifier for amplifying only the differences between peaks of said pulses and the mean of said peaks as an alternating current signal, means for impressing said signal to deflect said cathode ray beam in one of said two coordinate directions, means for sweeping said cathode ray beam in the other of said coordinate directions, and means for synchronizing said sweeping of said cathode ray beam with sequential illuminations of said photo-cell through said slots in time relation adapted to effect transfer of light from one of said slots to another of said slots substantially at the ends of said sweeps.

4. An electronic gauge for determining whether the size of an object lies between predetermined upper and lower limits, comprising, a member having a slot partially obstructed by said object, whereby the unobstructed area of said slot represents the size of said object, said member having further slots defining areas corresponding respectively to said upper and lower limits, a source of a single beam of light, a photo-cell having an output circuit for generating unidirectional voltage when illuminated by said beam of light, means for causing said source of light to illuminate said photo-cell through said slots in sequence to generate unidirectional voltage pulses, and means for amplifying only the difference between the peaks of said pulses and the mean of said peaks.

5. A system for measuring a dimension of an object by comparing quantities of light comprising, a test aperture partially blocked by said object and a comparison aperture, means for generating a beam of light, a photo-cell having an output circuit, means for directing said beam of light on said photo-cell through said test aperture partially blocked by said object and said comparison aperture periodically and in alternation to generate in said output circuit periodic unidirectional voltage pulses corresponding with the quantities of light passing through said test aperture partially blocked by said object and said comparison aperture in succession, and an alternating current amplifier having an input circuit connected to said output circuit, said alternating current amplifier amplifying only the difference between the peaks of said unidirectional voltage and the mean of said peaks as an alternating current signal.

6. Apparatus for measuring a dimension of an object, comprising, a member having a test slot and a comparison slot, said test slot having a larger width than said dimension, a source of light, a photo-cell device disposed to intercept light from said source of light via said test slot or via said comparison slot to generate D.-C. signals in response to said light which is dependent on the amplitude of said light, means for disposing said object in light blocking relation to said test slot to block light from a portion of the width of said test slot corresponding with said dimension, means for effecting transfer of light from said source of light to said photo-cell via said test slot and via said comparison slot in alternation to said photo-cell, to generate D.-C. pulses in said photo-cell device, and means comprising an amplifier of alternating current signals only for amplifying only the difference between the peaks of said pulses and the average of said peaks.

7. A system for measuring a dimension of an object in terms of a difference of magnitude between two quantities of light, comprising, a pair of apertures, one of said apertures partially blocked by said object, means for generating a beam of light, a photo-cell, an output circuit for said photo-cell, means for directing said beam of light on said photo-cell in alternation through said apertures for generating recurrent direct current electrical voltage pulses having each a predetermined polarity and a magnitude proportional to the light passing through one of said apertures and for generating in alternation with said first recurrent pulses further recurrent direct current electrical voltage pulses having each said predetermined polarity and a magnitude proportional to the light passing the other of said apertures, a coupling circuit for transferring A.-C. signals only and having a frequency response at least as low as the recurrence rate of said pulses, said coupling circuit having input terminals and output terminals, means for applying said first and said further recurrent pulses to said input terminals in relative alternation, and means for deriving from said output terminals recurrent pulses having magnitudes proportional to the difference between the peaks and the mean of the peaks of said unidirectional pulses applied to said input terminals, and of alternately opposite polarities.

8. A system for measuring a dimension of an object in terms of the differences between quantities of light, comprising three apertures, one of said apertures partially blocked by said object, a beam of light, a photo-cell having an output circuit, means for directing said beam of light on said photo-cell through said three apertures in succession to generate in said output circuit unidirectional pulses in succession, each of said pulses corresponding in magnitude to the quantity of light passing through one of said apertures, an alternating current amplifier coupled to said output circuit for amplifying as alternating current the differences between the peaks of said unidirectional pulses and the mean of said peaks.

9. Apparatus for measuring the dimension of an object comprising a member having a test slot adapted to be partially obstructed by the object, an upper limit and a lower limit slot, said last mentioned slots having areas corresponding to the upper and lower limits respectively of a predetermined tolerance range of said dimension, a source of light, a photo-cell having an output circuit, means for passing light from said source through said test slot and each of said upper and lower limit slots onto said photo-cell to generate sequential D.-C. pulses in said output circuit, and an alternating current amplifier connected to said output circuit for deriving and amplifying voltages representing only the differences between the peaks of said pulses and the mean of said peaks, and means responsive to said voltages to simultaneously indicate said limits of said tolerance range and the magnitude of said dimension with respect to said limits of said tolerance range.

NORMAN H. TAYLOR.
RAYMOND M. WILMOTTE.

REFERENCES CITED

The following references are of record in the file of this patent:

UNITED STATES PATENTS

| Number | Name | Date |
| --- | --- | --- |
| 1,746,525 | Darrah | Feb. 11, 1930 |
| 1,915,204 | Scheibli et al. | June 20, 1933 |
| 1,919,182 | Fitzgerald | July 18, 1933 |
| 2,089,430 | Roys et al. | Aug. 10, 1937 |
| 2,122,499 | Stocker | July 5, 1938 |
| 2,122,818 | Ladrach | July 5, 1938 |
| 2,124,600 | Worrall | July 26, 1938 |
| 2,139,474 | Shepard | Dec. 6, 1938 |
| 2,222,429 | Briebecher | Nov. 19, 1940 |
| 2,290,606 | Burnett | July 21, 1942 |
| 2,403,986 | Lacy | July 16, 1946 |
| 2,411,741 | Michaelson | Nov. 26, 1946 |
| 2,413,080 | Seeley | Dec. 24, 1946 |
| 2,439,373 | Stearns | Apr. 6, 1948 |
| 2,444,338 | Dimond | June 29, 1948 |
| 2,467,844 | Michel | Apr. 19, 1949 |